US007616205B2

(12) United States Patent
Matsumoto (10) Patent No.: US 7,616,205 B2
(45) Date of Patent: *Nov. 10, 2009

(54) IMAGE PROCESSING SYSTEM FOR VOLUME RENDERING

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 591 days.

This patent is subject to a terminal disclaimer.

(21) Appl. No.: 11/069,718

(22) Filed: Mar. 1, 2005

(65) Prior Publication Data

US 2006/0012822 A1    Jan. 19, 2006

(30) Foreign Application Priority Data

Jul. 15, 2004   (JP) .............................. 2004-208678

(51) Int. Cl.
*G06F 15/80*     (2006.01)
(52) U.S. Cl. ....................................................... 345/505
(58) Field of Classification Search ................. 345/501, 345/419; 358/1.15; 395/114
See application file for complete search history.

(56) References Cited

U.S. PATENT DOCUMENTS

| 5,283,897 | A | * | 2/1994 | Georgiadis et al. ........... 718/105 |
| 5,408,663 | A | * | 4/1995 | Miller ......................... 718/104 |
| 5,828,847 | A | * | 10/1998 | Gehr et al. ................... 709/239 |
| 5,828,876 | A | * | 10/1998 | Fish et al. ....................... 707/1 |
| 5,867,705 | A | * | 2/1999 | Mano .......................... 718/105 |
| 5,930,465 | A | * | 7/1999 | Bellucco et al. ............. 358/1.15 |
| 6,067,545 | A | * | 5/2000 | Wolff ........................... 707/10 |
| 6,091,422 | A | * | 7/2000 | Ouaknine et al. ........... 345/419 |
| 6,282,697 | B1 | * | 8/2001 | Fables et al. ................. 717/107 |
| 6,457,143 | B1 | * | 9/2002 | Yue ............................... 714/43 |
| 6,466,936 | B1 | * | 10/2002 | Ronstrom ..................... 707/10 |
| 2005/0010608 | A1 | * | 1/2005 | Horikawa .................... 707/200 |
| 2005/0108720 | A1 | * | 5/2005 | Cervini ........................ 718/105 |

FOREIGN PATENT DOCUMENTS

| JP | 63-201831 | | 8/1988 |
| JP | 2003-233600 | * | 8/2003 |
| JP | 2003-263420 | | 9/2003 |
| JP | 2004-187945 | | 7/2004 |

OTHER PUBLICATIONS

Japanese Office Action Dated Jul. 17, 2007.
Abdillah Agus Bani, Hashimoto Naoki, Nakajima Masayuki, "CG Production System Using PC-Cluster".

* cited by examiner

*Primary Examiner*—Peter-Anthony Pappas
(74) *Attorney, Agent, or Firm*—Pearne & Gordon LLP (57) ABSTRACT

In an image processing system for generating an image of a three dimensional structure using a volume data, having a plurality of nodes coupled via a network, said one of plurality of nodes is constituted in combination with a control portion comprising at least a processor, a memory, and a communication control portion, said control portion is operative to segment each of a plurality of image processing requests into a plurality of jobs in an image processing operation that use the volume data, monitor a calculation resource amount for each of said plurality of nodes on the job accepting side to obtain a calculation resource information, said calculation resource information being calculated from at least any one of a current load factor, a performance record in the past, a node status specification, and a distance to the node on the network, select at least one node on the job accepting side based on said calculation resource information, and transmit one of said segmented jobs to said selected node.

22 Claims, 5 Drawing Sheets

IMAGE PROCESSING SYSTEM FOR VOLUME RENDERING

This application claims foreign priority based on Japanese Patent application No. 2004-208678, filed Jul. 15, 2004, the contents of which is incorporated herein by reference in its entirety.

BACKGROUND OF THE INVENTION

1. Field of the Invention

The present invention relates to an image processing system for volume rendering, and more particularly to an image processing system for performing a volume rendering image processing or a region segmentation processing, using a plurality of computers connected via a network.

2. Description of the Related Art

With the development of an image processing technique using computer, appearance of CT (Computer Tomography) scanner and MRI (Magnetic Resonance Imaging) that enables an internal structure of the human body to be directly observed has brought about innovation in the medical field. A medical diagnosis using a tomographic image of the living body has been widely performed. In recent years, as a technique for visualizing a three dimensional structure inside the complex human body which is difficult to recognize only with the tomographic image, for example, a processing technique for directly drawing an image of the corresponding three dimensional structure from the three dimensional digital data of the object obtained from CT scanner or other image acquiring system, particularly an image processing called the volume rendering, has widespread, and has been employed for medical diagnosis.

Conventionally, ray casting has been well known as a superior method for volume rendering. Ray casting is a method for forming a transparent image of three dimensional structure inside an object by radiating virtual rays from a virtual starting point to the object, and forming the image of a virtual reflected light which comes from inside the object on a virtual projection plane. A fundamental theory of ray casting is described in "Introduction To Volume Rendering", written by Barthold Lichtenbelt, Randy Crane, and Shaz Naqvi, Hewlett-Packard Professional Books (published in 1998), Chapter 6, pg. 121-138, for example.

Herein, ray casting is briefly described.

A minute unit area forming a constituent unit of the three dimensional area of the object is called a voxel, and the intrinsic data of the voxel representing the characteristic such as a density value is called a voxel value. The entire object is represented by voxel data which is three dimensional array of voxel values. Usually, two dimensional tomographic images obtained by CT scanner or other image acquiring system are layered and interpolated, as required, whereby voxel data of three dimensional array is obtained.

A virtual reflected light from virtual rays radiated from virtual starting point to the object is produced in accordance with opacity, an opacity value, which is artificially set by voxel value. Moreover, in order to shade a virtual surface stereoscopically, a gradient of voxel data, that is a normal vector, is obtained, and a shading factor for shading is calculated from the cosine of the angle between the virtual ray and the normal vector. The virtual reflected light is calculated by multiplying the intensity of virtual rays radiated to the voxel by the opacity of voxel and the shading factor. The virtual reflected light is integrated along virtual rays, and calculated for all the coordinate points on the virtual projection plane, whereby a virtual transparent image of a three dimensional structure is formed. The above calculation is hereinafter referred to as a "volume rendering process".

A volume rendering image obtained as described above is a three dimensional color image drawn by using a number of volume rendering parameters for the subject voxel data.

Volume rendering parameters include display control parameters such as zoom ratio, angle and position, color parameters, opacity parameters, shading parameters, image filter, image fusion method, rendering method, light source, time series and phase parameters, projection method, display area parameters, segmented area parameters and multi image registration parameters. These parameters are referred to as the "additional information" in the following.

In practical medial diagnosis, user of a medical image processing system observes volume rendering image from various points of view by successively updating the settings of the volume rendering parameters for subject voxel data. For example, since adequate opacity value varies according to a diagnosis tissue, the user sets up the opacity value for each voxel data. Also, in order to easily observe a region of interest such as a diseased part, tissues obscuring the region of interest are removed, or tissues are colored appropriately.

It may also be necessary for the user to set parameters by performing various complicate edit operations. The edit operations may be continued until appropriate parameters are set and a volume rendering image which meets a diagnosis purpose is obtained.

Conventionally, the total process of image processing of volume rendering, including storage, calculation and display, is performed by one or more computers. Especially for cases in which a plurality of computers are employed, various innovations are made on distribution of computer resources and parallel processing.

Also, various methods for distributing the total process of image processing of volume rendering over a plurality of computers have been offered (e.g., refer to JP-A-2003-233600).

Since volume rendering is an image processing that requires a large amount of calculation, resources of a single computer may not be enough to perform it accurately or in real time. Therefore, as described above, a conventional volume rendering image processing system employs methods for performing distributed or parallel processing of calculation resources.

In conventional image processing systems where a plurality of computers are used, a volume rendering process is segmented in advance into appropriate jobs, which are loads, so as to permit the plurality of computers to perform distributed processing. However, when this method is adopted, the calculation resources may not be effectively utilized and a delay in the job processing may occur.

Some of the reasons are in operating speed differing with each computer, a computer being good or poor at performing a particular type of calculation such as integer or floating-point operation, and variations in network performance. Further, performance of a computer also depends on its current state. For example, transmission of a volume data is not required if the computer has already been processing the same volume data, or processing speed of a job may be slow if another job has already been started in the computer.

SUMMARY OF THE INVENTION

To resolve these problems, it is one object of the present invention to provide an image processing system wherein instead of assigning a job equally to a plurality of computers or nodes, a job is suitably assigned by taking into account the current load factors and performance records in the past, of individual computers or nodes, so that the computer calculation resources can be effectively utilized, and job processing speed is increased compared to related arts.

According to the invention, in an image processing system for generating an image of a three dimensional structure using a volume data, said image processing system having a plurality of nodes coupled via a network, each of which belonging to at least any one of a job requesting side and a job accepting side, where at least one of said plurality of nodes is on the job requesting side, said one of plurality of nodes on the job requesting side is constituted in combination with a control portion comprising at least a processor, a memory, and a communication control portion, said control portion being operative to: segment each of a plurality of image processing requests into a plurality of jobs in an image processing operation that use the volume data; monitor a calculation resource amount for each of said plurality of nodes on the job accepting side to obtain a calculation resource information, said calculation resource information being calculated from at least any one of a current load factor, a performance record in the past, a node status specification, and a distance to the node on the network; select at least one node on the job accepting side based on said calculation resource information; and transmit one of said segmented jobs to said selected node.

Further, in the image processing system using said volume data of the invention, said control portion further being operative to prioritize each of said segmented jobs to obtain a job priority, and rank the current operation capabilities of said plurality of nodes on the job accepting side based on said calculation resource information individually obtained by monitoring said calculation resource amount so as to determine a current operation ranking, wherein said at least one node on the job accepting side is selected based on the current operation ranking, and each of said segmented jobs is transmitted to said selected node according to said job priority.

Further, in the image processing system using said volume data of the invention, each of said segmented jobs is transmitted when a client selects data and initiates processing.

Further, in the image processing system using said volume data, each of said segmented jobs is transmitted when a client commands.

Further, in the image processing system using said volume data, said segmented jobs are queued in said selected node.

Further, in the image processing system using said volume data, at least one of said selected node is capable of processing said transmitted segmented jobs automatically according to said job priority.

Further, in the image processing system using said volume data, at least one of said selected node is capable of changing the priority of said transmitted segmented jobs.

Further, in the image processing system using said volume data at least one of said selected node is capable of processing said transmitted segmented jobs in parallel.

Further, in the image processing system using said volume data, said selected node notifies said at least one of the plurality of nodes on the job requesting side of the progress and the completion of said transmitted one of the segmented jobs.

Further, in the image processing system using said volume data, said selected node which has received said transmitted one of the segmented jobs is capable of transmitting said transmitted one of the segmented jobs to at least any one of the plurality of nodes on the job accepting side.

Further, in the image processing system using said volume data, an operating state of said plurality of nodes on the job accepting side is displayed on a display screen of a client.

Further, in the image processing system using said volume data, said control portion further being operative to transmit a change command, a pause command and a halt command of said transmitted one of the segmented jobs to said selected node.

Further, in the image processing system using said volume data, said selected node is capable of transmitting a completion information of said transmitted one of the segmented jobs to notify the completion of said transmitted one of the segmented jobs, said control portion further being operative to receive said completion information of said transmitted one of the segmented jobs, and transmit a halt command of said transmitted one of the segmented jobs to said selected node.

Further, in the image processing system using said volume data, said selected node is capable of transmitting a progress information of said transmitted one of the segmented jobs to notify the progress of said transmitted one of the segmented jobs, said control portion further being operative to receive said progress information of said transmitted one of the segmented jobs and transmit a halt command of said transmitted one of the segmented jobs to said selected node based on said progress information.

Further, in the image processing system using said volume data, the image processing using said volume data includes at least any one of processing among a volume rendering processing, a region segmentation processing, a filtering processing, a noise removal processing, an image synthesis processing, a perfusion computation processing, a back projection processing, a projection processing and a geometry transformation processing.

Further, in the image processing system using said volume data, said plurality of nodes includes at least any one of a computer, a supercomputer containing a plurality of CPUs, and a server.

According to the invention, in a method of image processing for generating an image of a three dimensional structure using a volume data of an object, where a plurality of nodes are provided coupled via a network, said method comprising: segmenting each of a plurality of image processing requests into a plurality of jobs in an image processing operation that use the volume data; monitoring a calculation resource amount for each of said plurality of nodes to obtain a calculation resource information, said calculation resource information being calculated from at least any one of a current load factor, a performance record in the past, a node status specification, and a distance to the node on the network; selecting at least one node based on said calculation resource information; and transmitting one of said segmented jobs to said selected node.

Further, in the method of image processing, said plurality of nodes includes at least any one of a computer, a supercomputer containing a plurality of CPUs, and a server.

DESCRIPTION OF THE PRFERED EMBODIMENTS

The best mode for carrying out the invention will now be described in detail while referring to the drawings.

Figure 1:
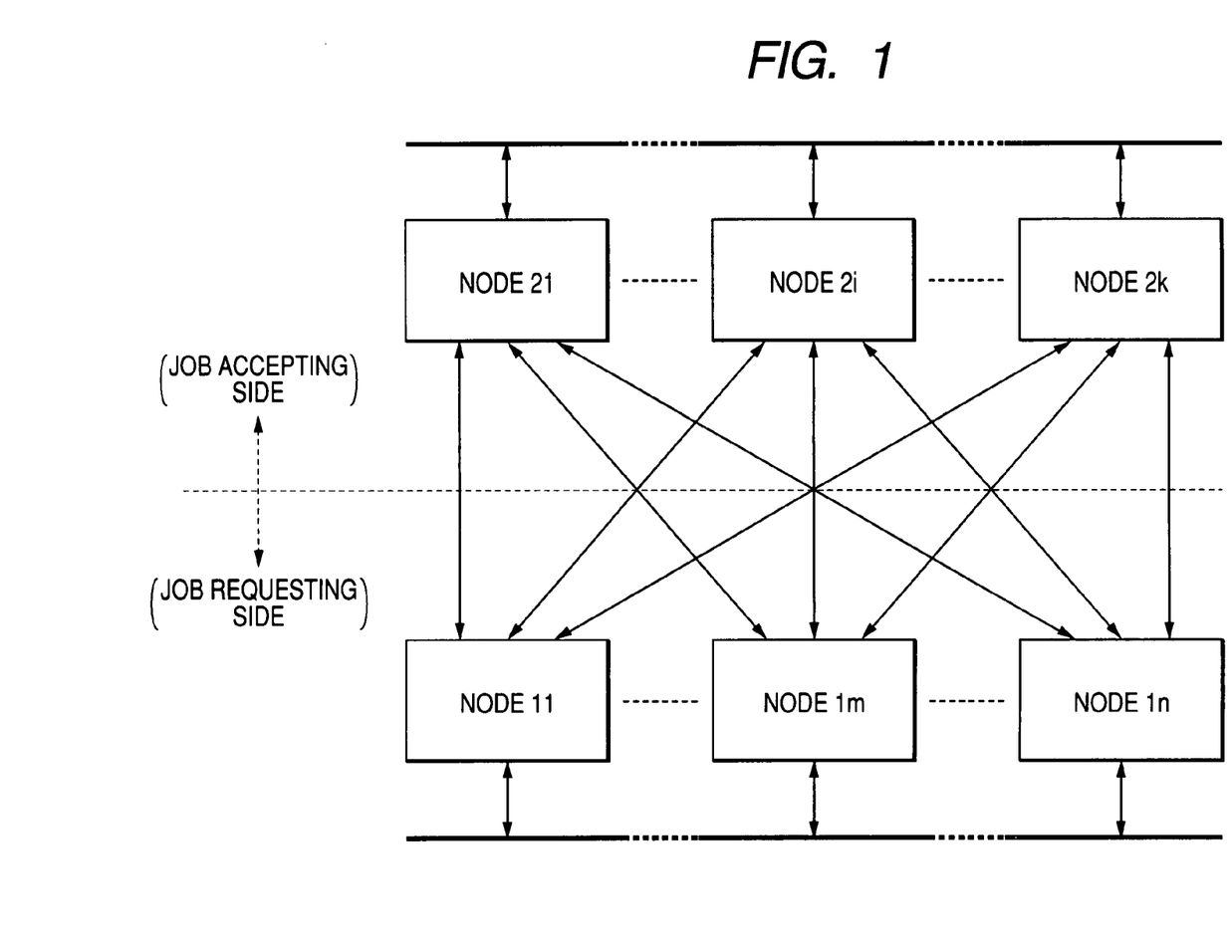
FIG. 1 is a block diagram showing a network configuration of a volume rendering image processing system according to an embodiment of the present invention.

FIG. 1 is a block diagram showing a network configuration of a volume rendering image processing system according to one embodiment of the invention.

As shown in FIG. 1, the network configuration of the volume rendering image processing system according to the embodiment comprises the nodes 11 to 1$n$ on the job requesting side which segment a volume rendering processing into jobs, and the nodes 21 to 2$k$ on the job accepting side. Each of the nodes is connected to a network and communicable with other nodes via the network. The term "node" as used herein means a computer as a computing unit; a supercomputer containing a plurality of CPUs, a server, a personal computer, and a notebook personal computer may respectively be all one nodes.

The nodes 11 to 1$n$ are in the equivalent relation with each other. Also, the nodes 21 to 2$k$ are in the equivalent relation with each other.

Figure 2:
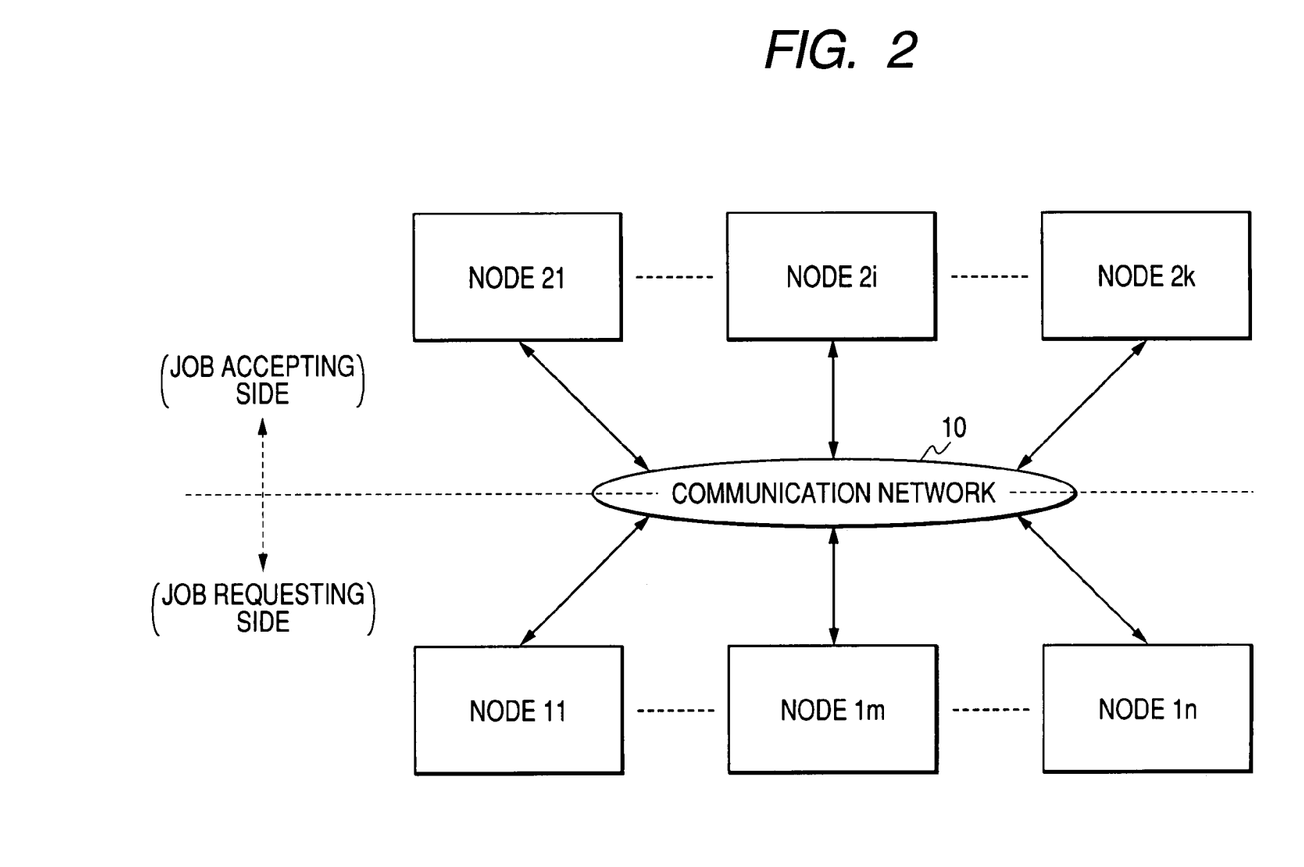
FIG. 2 is a block diagram showing the overall configuration of the volume rendering image processing system according to the embodiment of the invention.

FIG. 2 is a block diagram showing the overall configuration of the volume rendering image processing system according to the embodiment of the invention.

The overall configuration of the volume rendering image processing system as shown in FIG. 2 corresponds to the network configuration as shown in FIG. 1.

As shown in FIG. 2, the volume rendering image processing system according to the embodiment comprises the nodes 11 to 1$n$ on the job requesting side in which a volume rendering processing is segmented into jobs, and the nodes 21 to 2$k$ on the job accepting side.

Each of the nodes is connected to a communication network 10 and communicable with other nodes via the communication network 10.

The communication network 10 may be LAN (Local Area Network), or other connection lines which includes the Internet or which connects the Internet.

Other connection lines include public network, ISDN, packet communication line, frame relay network, ATM line, private line, ADSL, PHS line, or optical communication cable line. Also, other lines which will spread in the future such as CATV are usable as far as the specifications of the lines allow the Internet to be used.

Figure 4:
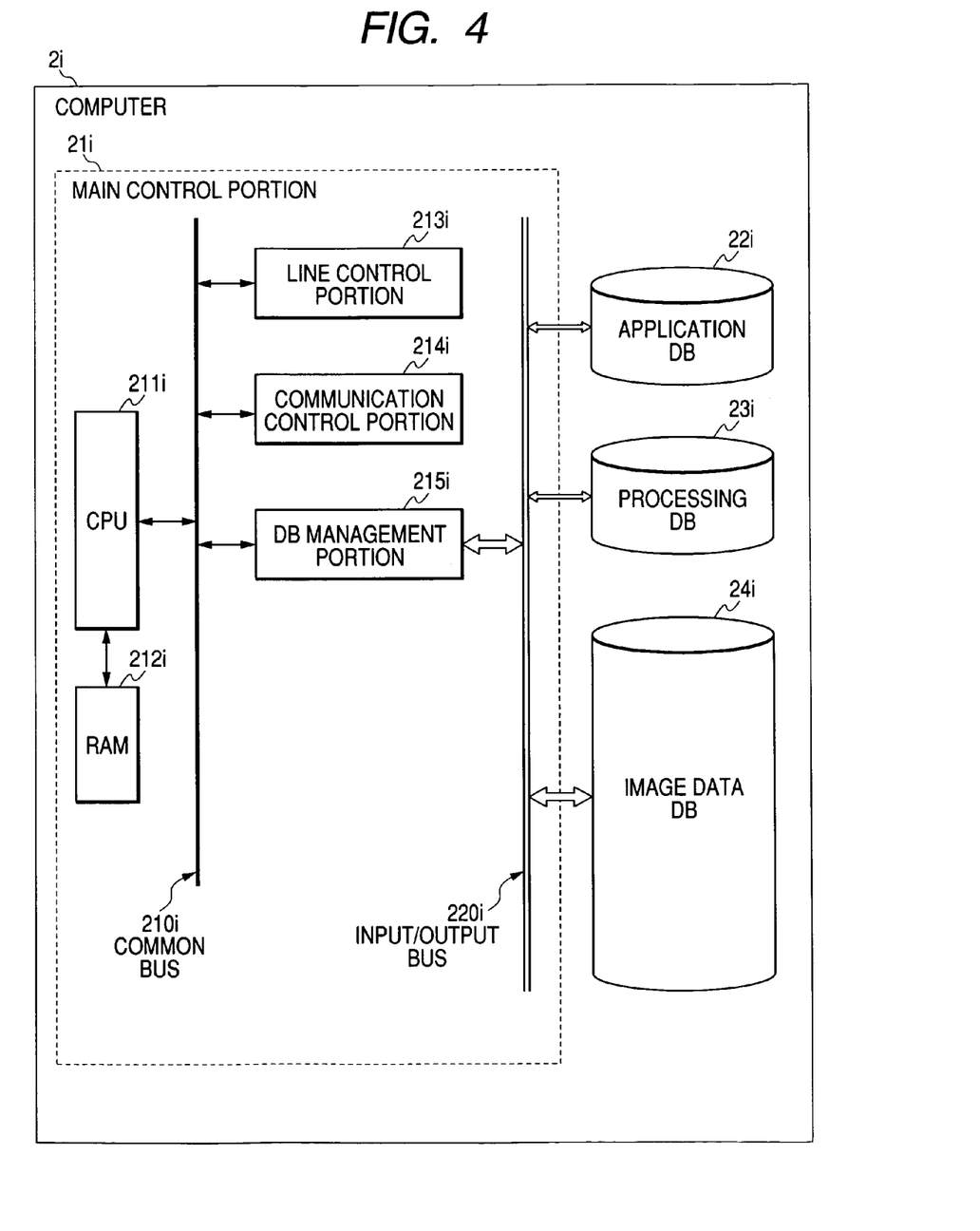
FIG. 4 is a block diagram showing the configuration of a node on the job accepting side in the volume rendering image processing system according to the embodiment of the invention.

FIG. 4 is a block diagram showing a configuration of a node in the volume rendering image processing system according to the embodiment of the invention. More specifically, the figure shows the configuration of the node 2$i$ on the job accepting side in FIG. 2, but the configuration is common to any node. With this configuration, a node can be either or both on the job requesting side and on the job accepting side.

A node comprises a main control portion 21$i$ for controlling the entire system and processing jobs, an application DB (database) 22$i$ used for general applications, a management DB 23$i$ recording information required for management of the other nodes.

The main control portion 21$i$ comprises a CPU 211$i$ which controls the entire system, a RAM 212$i$ into which three dimensional digital data is read, a line control portion 213$i$ having a router function, a communication control portion 214$i$ having a communication function, a DB management portion 215$i$ which controls each database, a common bus 210$m$ which transmits commands and data between the CPU 211$i$ and the other components, and an input/output bus 220$m$ which transmits control signals and data between the DB management portion 215$i$ and each database.

The RAM 212$i$ stores three dimensional digital data read from the image data DB 24$i$, and supplies the three dimensional data to the CPU 211$i$, as needed.

The line control portion 213$i$ is used for a connection to the communication network 10 as shown in FIG. 2, such as a router mounting a digital service unit (DSU) or a firewall application to prevent invasion.

The communication control portion 214$i$ controls the communication processing with other nodes. This communication control portion 214$i$ may comprise an NTP (Network Time Protocol) server for time synchronization on the Internet, and an NFS (Network File System) server for distributed file system. The communication control portion 214$i$ further holds an encryption communication protocol for transferring encrypted data, and provides encryption communication service.

The DB management portion 215$i$ controls the application DB 22$i$, the management DB 23$i$ and the image data DB 24$i$ by commands from the CPU 211$i$, and inputs or outputs data stored in the databases into or from the CPU 211$i$.

A node may also comprise an image data DB 24$i$ storing three dimensional digital data obtained from CT scanner or other image acquiring system. Alternatively, an image data DB can be implemented in an independent data server and shared by all nodes, although such configuration may degrade performance when multiple nodes concurrently read a same image data.

Figure 3:
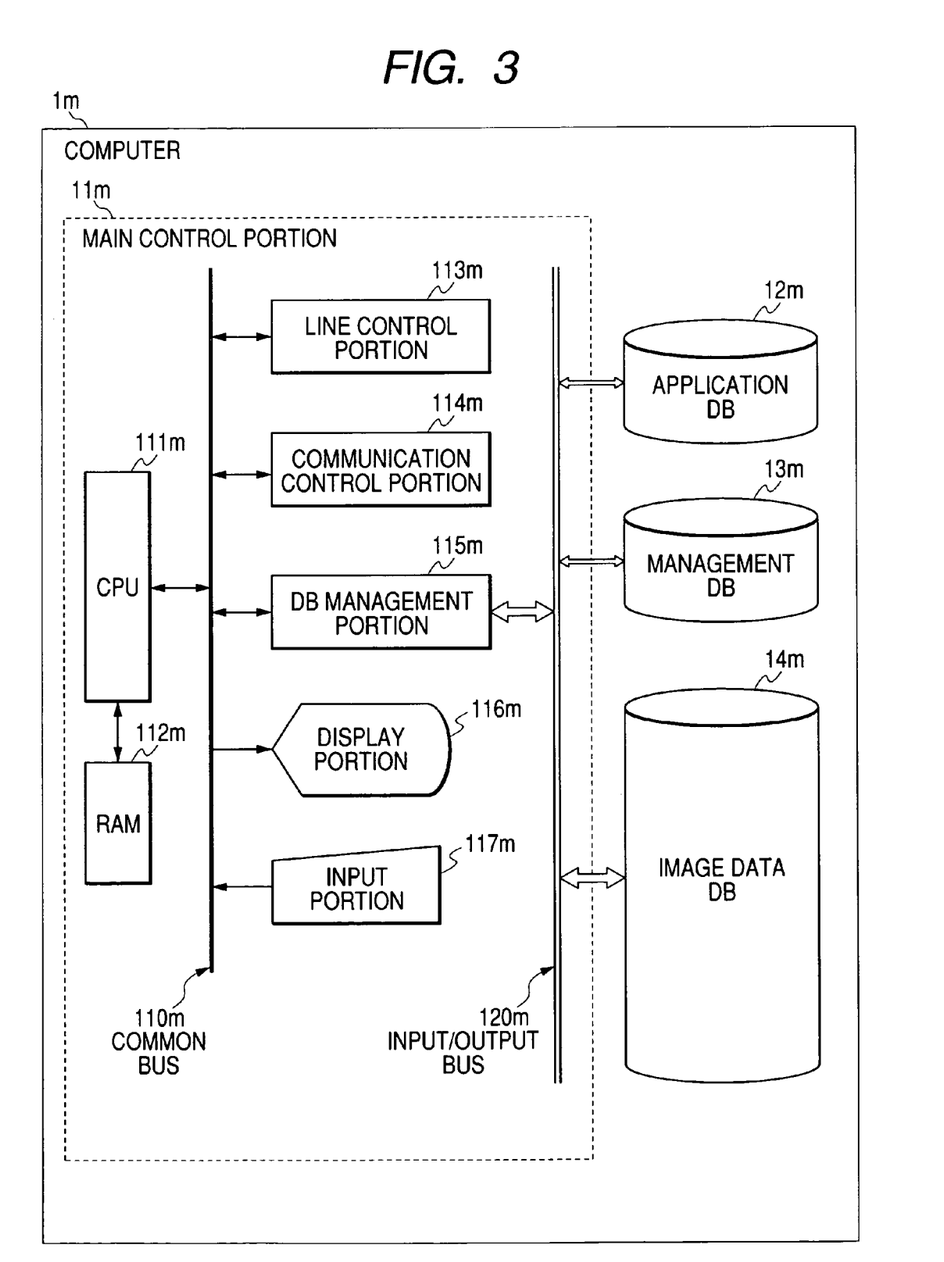
FIG. 3 is a block diagram showing the configuration of a node on the job requesting side in the volume rendering image processing system according to the embodiment of the invention.

Further, at least one of the nodes on the job requesting side works as a client, to which a user input an image processing request. FIG. 3 shows the configuration of the node 1$m$ on the job requesting side in FIG. 2, assuming that it functions as a client. In addition to the components shown in FIG. 4, the client comprises a display portion 116$m$ and an input/output portion 117$m$. The display portion 116$m$ displays three dimensional images according to commands and data controlled by the CPU 111$m$. The input/output portion 117$m$ is used to allow the user to input commands for volume rendering processing or image display. Not all of the nodes on the job requesting side need to comprise those components as a client. However, the present invention is especially effective when a plurality of clients concurrently transmits image processing requests to a plurality of nodes on the job accepting side.

The operation of the volume rendering image processing system according to the embodiment of the invention will be described below. According to one example of the invention, a plurality of jobs are transmitted to one or more nodes on the job accepting side by considering the load of each node on the job accepting side. A job as used herein means a processing sequence which constitutes a volume rendering process requested by a user. For example, a request to render an image can be segmented into a job which renders one third of the image from the top and a job which renders the rest of the image.

In this case, the CPU 111$m$ of an arbitrary node 1$m$ on the job requesting side segments each of a plurality of the volume rendering processing requests into a plurality of jobs, and prioritizes each segmented job. At this time, data corresponding to the volume rendering processing is read sequentially from the image data DB 14*m* into the RAM 112*m* and analyzed, as needed.

The contents of the priority include the priority derived from the load factor and history of the past of the nodes on the job accepting side, and the priority that the job requesting side appends to the contents of the image processing.

The priority according to the load factor enables to transmit segmented jobs requiring a large amount of calculation to nodes having low load, and transmit those requiring less amount of calculation to nodes having high load. Each node registers its self-processing ability, performance record in the past, node status specification and distance on the network in a node calculation resource monitoring section of the present invention provided in a common job management portion, and reports the current processing content successively.

The node 1*m* can access to the node calculation resource monitoring section to obtain the current load factor, performance record in the past, node status specification and distance on the network for each node, by which the node 1*m* selects a plurality of nodes on the job accepting side to transmit segmented jobs.

By obtaining current load factor of each node on the job accepting side, the node 1*m* can transmit a job according to the current capability of each node on the job accepting side. For example, it is avoided that a new job transmitted to a node on which a large load is currently imposed, even if the node is capable of high-speed performance. On the other hand, a new job can be transmitted to a node on which no load or a small load is currently imposed, even if the node is not suitable for high-speed operation.

Further, the node 1*m* can determine, by obtaining performance record in the past and the current state of a node on the job accepting side, whether the node already holds a certain volume data or not, thereby avoiding unnecessary transmission of the same volume data to the node.

Further, the node 1*m* can determine, based on the history of the past and the current state of a node on the job accepting side, particular types of operation that the node is suitable for. For example, when a node is determined to be good at integer operation, a job that includes many integer arithmetic calculations can be transmitted to the node. When a node is determined to be good at floating-point operation, a job that includes many floating-point arithmetic calculations can be transmitted.

The node status specification corresponds to the capacity of a disk, network, CPU and memory. It includes network capacity because, for transmitting a large amount of image data, not only a memory and a disk having appropriate capacities are required, but also a line having a data capacity to transmit a large amount of data is required.

The distance on the network is calculated from number of hubs and routers located between the nodes, bandwidth of a line, the current local use state of the network, and the future local state of the network predicted in accordance with instructions that have already been issued.

The CPU 111*m* ranks the current calculation capabilities of the individual nodes on the job accepting side, based on the information obtained from the node calculation resource monitoring section. The CPU 111*m* examines the rank of the current calculation capabilities of the nodes and the priority of the segmented jobs determined in the above described manner, and assigns the segmented jobs in order from the highest priority, to the nodes in order from the highest calculation capability. At this time, a job having a high priority may be allocated to a plurality of nodes having high calculation capabilities, and may be processed competitively in parallel.

As another example, a segmented job may be transmitted to all nodes on the job accepting side except those on which excessive load have been imposed.

The assignment of a segmented job is dynamically performed each time the client selects the data and starts the process, or is started when the client issues an instruction.

The jobs can be queued in each of the nodes on the job accepting side to which they are transmitted. This enables the nodes to process the transmitted jobs smoothly with minimum delays, by, for example, prefetching image data required for the next job in the queue while processing the current job.

When a plurality of jobs are queued in a single node on the job accepting side, and these jobs are prioritized, the job process can be automatically started in the order of the priority.

Further, when a plurality of jobs are transmitted to a single node on the job accepting side, the node is permitted to change the priority of the jobs, so that the job processing can be flexibly performed.

Further, when a plurality of jobs are queued in a single node on the job accepting side, the jobs can be processed by the node in parallel.

Further, each node on the job accepting side can notify the node 1*m* of the progress and the completion of the transmitted jobs, so that the node 1*m* can obtain the operating state of each node on the job accepting side. To increase usability, the operating state may be displayed on the screen of the client so that a user can visually ascertain the operating condition.

Further, a node on the job accepting side can also transmit a segmented job to another node on the job accepting side, instead of processing the segmented job all by itself.

The control portion which controls the job assignment may be shared by a plurality of nodes on the job requesting side, so as to enhance efficiency of calculation resources.

When a node on the job accepting side completes a segmented job, it notifies the node 1*m*. Then, the CPU 111*m* obtains the processing result of the segmented job from an earliest one of the nodes on the accepting side that has completed the job.

On receiving the processing result of the job, the node 1*m* verifies the result, and if there is no problem, transmits a halt command to each of the nodes on the job accepting side which are still engaged in the processing of the segmented job.

Finally, the node 1*m* checks whether all the segmented jobs have been completed. If any of the segmented jobs remain uncompleted, the series of processes described above is repeated, starting with the collection of the load information of the nodes on the accepting side.

The node 1*m* may be permitted to transmit a change command, a pause command or a halt command of a segmented job. More specifically, a user can identify the operating state of each node on the job accepting side displayed on the screen, and can flexibly change, pause or halt the execution of a segmented job by a node, which is falling behind other nodes in the job progress. As a result, it is possible to avoid continuing unnecessary calculation.

Each of the nodes on the job accepting side independently reads image data from the image database 24*i* into the RAM 212*i*.

A node on the job accepting side can start preparing voxel data while processing a job using another voxel data, thereby shortening the processing time. The processing time also depends on the capacity of the RAM 212*i*. In order to increase its effective capacity, data can be dynamically relocated.

The process of segmenting an image processing request into jobs and merging their results is complicated in itself.

Therefore, an image processing request is segmented only when the overall processing time is predicted to be shortened even by performing the complicate process of job segmentation. A simple image processing request which demands only a small amount of calculation may not be segmented.

While referring to the flowchart in FIG. 5, an explanation will now be given mainly for steps S22 and S23, and especially for a method of selecting a node to which a job is transmitted, in the volume rendering image processing system according to the embodiment.

First of all, in step S21, the CPU 111m of an arbitrary node 1m on the job requesting side segments each of a plurality of the volume rendering processing requests into jobs, and prioritizes the segmented jobs.

Then, in step S22, the CPU 111m obtains, from the node calculation resource monitoring section, calculation resource information concerning the current load factor, the performance record in the past, the node status specification and the distance on the network of the nodes 21 to 2k on the job accepting side.

By obtaining the current load factor of the nodes, a new job will not be transmitted to a node on which an excessive load is currently imposed even if the node is capable of high-speed performance. On the other hand, a new job will be transmitted to a node on which no load or a small load is currently imposed even if the node is not suitable for high-speed processing.

Further, by obtaining the performance records in the past, it is determined whether a node on the job accepting side already holds a certain volume data, to avoid unnecessary re-transmission of the same data. It is also determined which node is suitable for high-speed processing or suitable for handling large amount of data, to select an appropriate node to transmit a job.

Furthermore, by obtaining the node status specifications, it is determined which node is connected to a line that has a large data capacity and capable of transmitting a large amount of data.

In addition, by obtaining the distance on the network, the time required to reach a node can be predicted.

Following this, the CPU 111m ranks the current operation capabilities of the nodes on the job accepting side based on the calculation resource information, so as to determine a current operation ranking. The CPU 111m examines the current operation ranking and the job priority determined in step S21, and in step S23, assigns the segmented jobs in order from the highest priority, to the nodes in order from the highest calculation capability.

A job having a high priority is assigned to a plurality of nodes having high calculation capabilities, and processed competitively in parallel by the plurality of nodes.

Then, in step S24, the CPU 111m transmits one of the segmented jobs to the nodes (21 to 2k) on the job accepting side.

Then, the nodes on the job accepting side process the segmented job. In case the node 1m is also a node on the job accepting side, it processes the segmented job transmitted to itself in step S25.

Thereafter, in step S26, the CPU 111m receives the processing result of the segmented job from an earliest one of the nodes on the accepting side that has completed the segmented job.

Then, in step S27, the CPU 111m verifies the received processing result of the segmented job.

Then, in step S28, the CPU 111m transmits a halt command of the segmented job to other nodes on the job accepting side which are still processing the segmented job.

Finally, the CPU 111m checks whether or not all the segmented jobs have been completed. If any one of the segmented jobs remains uncompleted, the operation returns to step S22. Otherwise the operation is ended in step S29.

In this embodiment, the processing requests to be processed by the system are those of volume rendering. However, the system according to the invention can be applied to other arbitrary processes. Especially the system according to the invention can be employed as a grid computing system.

A node can be both on the job accepting side and on the job requesting side at the same time. This suggests that a node may handle both the assignment control and the processing of a segmented job. In order to achieve performance, it is desirable that a plurality of computers work as nodes on the job accepting side.

Figure 5:
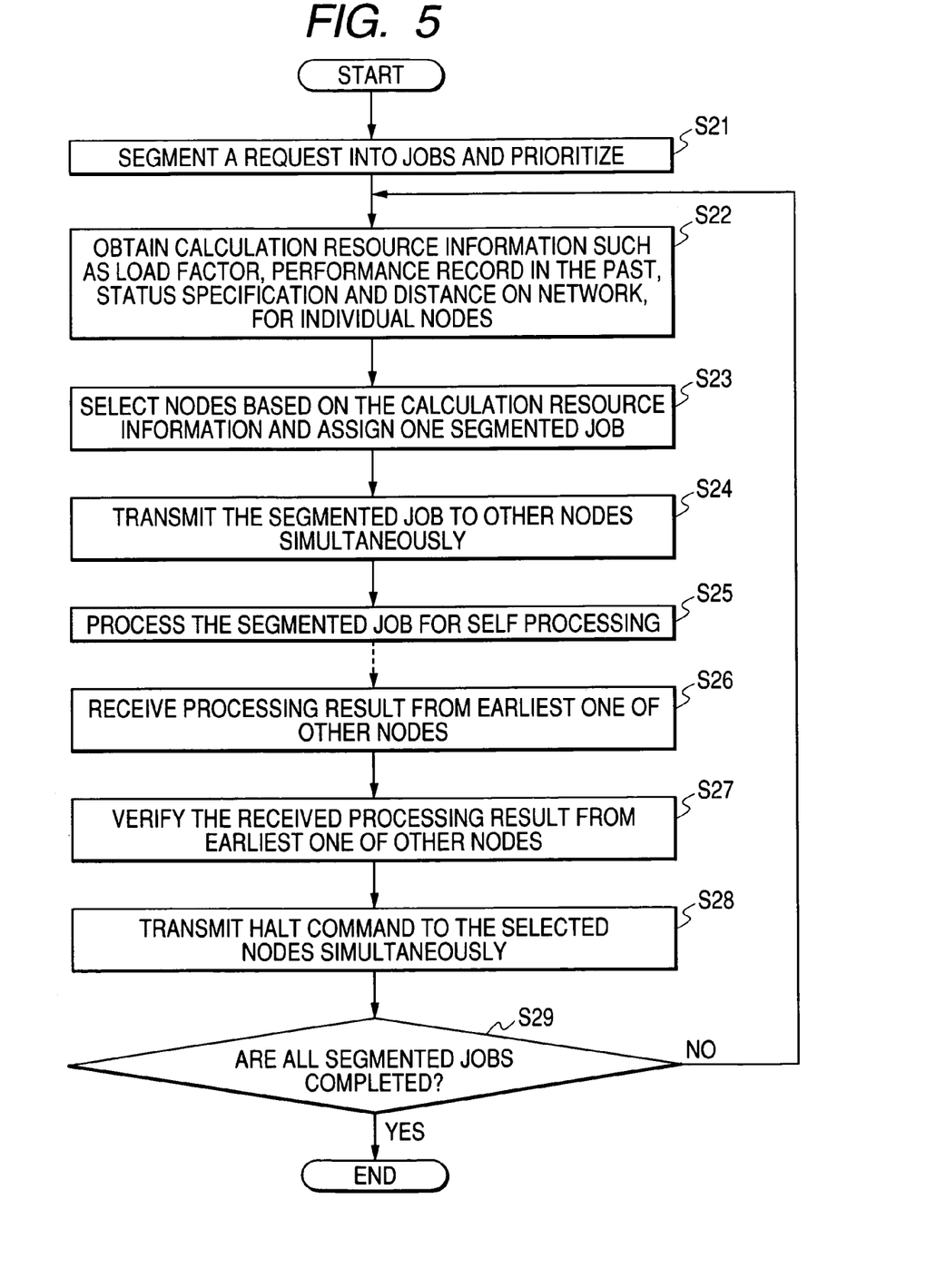
FIG. 5 is a flowchart showing an operation of a node on the job requesting side in the volume rendering image processing system according to the embodiment of the invention.

At least a part of the operation of the CPU 111m shown in FIG. 3 according to the invention is performed by controlling the computer, and a program which performs the operation by the procedure as shown in the flowcharts of FIGS. 5 may be stored and delivered in a computer readable recording medium such as a semiconductor memory, a CD-ROM, or a magnetic disk. A computer which is at least in the same category as a microcomputer, a personal computer, and a general-purpose computer may read and execute the program from the recording medium.

The client, which is a node on the job requesting side, can also be a node on the job accepting side and process a segmented job. Specifically, the client is suitable for processing segmented jobs for post-processing in volume rendering, since such jobs require relatively small amount of calculation, and the resulting image can be promptly displayed on the client screen.

For example, it is preferable that the affine computation, which is the last processing in volume rendering, is assigned to the client.

Also, it is preferable that the WL transformation and affine transformation to create an image suitable for user presentation from a multi-bit image, usually of 9 bits or more, are assigned to the client.

Also, it is preferable that the processing of expansion, shrinking, and pan for the display on the user interface (UI) screen is assigned to the client.

Also, when a GPU is mounted, it is preferable that the above processing is assigned particularly to the GPU. The GPU stands for Graphic Processing Unit, a processor that is designed particularly for image processing, compared to the general-purpose CPU, and usually mounted on the computer separately from the CPU. In this case, it is desirable that the GPU has a function of reading the control code dynamically and changing the processing contents during execution.

Also, it is preferable that the information of a patient, such as patient name, birthday, age and so on, which is the collateral information other than the image, is assigned particularly to the client.

The client maybe a Web browser plug-in, a plug-in program.

In the distributed image processing as described above, a node on the job requesting side transmits a halt command of a segmented job only after it receives the processing result of the job from one of the nodes on the job accepting side. However, the halt command can also be transmitted to a node before receiving the processing result, judging that there is no possibility that the node completes the segmented job the earliest. In this way, wasteful processing is not continued and the operation is performed more efficiently.

To make this operation effective, nodes on the job requesting side need to be capable of acquiring the progress information of a segmented job, and, based on the progress information, transmitting a halt command for the segmented job to one or more nodes on the job accepting side which are processing the segmented job.

Though the distributed processing of volume rendering has been described above in the embodiment, the distributed processing of the invention is not limited to volume rendering, but may be applied to the general image processings using volume data. For example, the invention is applicable to region segmentation, image filtering, noise reduction, image fusion, perfusion calculation, back projection, projection, geometry transformation, and so on. Particularly, the region segmentation is effectively performed, because it helps diagnosis by segmenting the surface and the central line representing the internal organs from the VOI, which stands for Volume of Interest, and drawing the image using segmented data.

As is described above, according to the volume rendering image processing system of the invention, instead of equally assigning segmented jobs to the nodes on the job accepting side, appropriate nodes for each segmented job are selected based on the load factor of individual nodes.

With this arrangement, of a plurality of calculation resources available on a network, only those resources that can currently be employed are extracted, and in accordance with their load factors, these resources are requested to perform either large arithmetic operations or small arithmetic operations. Furthermore, when a plurality of nodes having satisfactory calculation capabilities are currently available, instead of transmitting a different job to each node, which may take too much time to divide and merge the jobs, the same job is transmitted to a plurality of selected nodes, so that the nodes compete with each other in completing the calculations. Then, the first obtained calculation result is employed, while at the same time, job halt command is transmitted to the other nodes that are currently performing the calculations. In this manner, there is a greater increase in the calculation speed.

Further, a node on the job requesting side, which handles user's requests and controls job assignment, can be, at the same time, a node on the job accepting side which processes a segmented job. Thus, any node in the system can contribute to the processing of segmented jobs, thereby improving system efficiency.

In database applications, time needed to request a data processing job to a certain node and receive a reply depends greatly on the type of the job requested such as a data search, the extraction of data or the coupling of tables, and the size of a database, the deviation of data, the data sorting state, the state of a fixed storage device and the arrangement of data in the storage device. Thus, the processing time can not easily be predicted.

Therefore, in database applications, methods similar to the present invention are used, in which the same job is issued to a plurality of nodes, and the first output obtained is employed.

On the other hand, in medical image processing, calculation amount of a volume rendering process is relatively easy to predict, especially when the same rendering process is repeated in which only the projection angle and light source parameters are changed. Accordingly, it has conventionally been considered that, unlike in database applications, it is not necessary for nodes to compete with each other.

However, in a medical image processing system, if a plurality of clients exist in the system and issue processing requests simultaneously, computation time of the requests is difficult to predict since the system performance changes according to the behavior of each of the clients. The present invention is particularly effective in such case, as the processing requests are distributed across a plurality of nodes according to the current performance of each of the nodes. In other words, the present invention automatically balances the computation load between the nodes, whose performance unpredictably changes according to other users.

Additionally, even when the computation time of a job can be predicted within a certain range, the present invention helps to achieve the shortest computation time in the range by making a plurality of nodes competitively perform the same job. This is relevant especially when a real time image processing is required for medical diagnosis.

Another advantage of the present invention when applied to medical image processing is that one image processing request can be flexibly segmented into jobs that call for various amount of calculation, which is not the case in database applications. In database applications, a processing request is not segmented, and the same job is transmitted equally to all nodes. On the other hand, in medical image processing, a rendering request for obtaining one image can be segmented into jobs requiring various amount of calculation in view of the load factor of each node. For example, to calculate one display image, the image may be simply divided into two third from the top and one third at the bottom, or the procedure of image processing may be segmented into steps. A job which requires a large amount of calculation is transmitted to nodes having low load factor, while a job which requires a small amount of calculation is transmitted to nodes having high load factor.

As another example, an image processing request may be segmented into three types of jobs which are small, medium and large jobs, and nodes may be brought into competition with each other for each type of jobs.

The present invention can also be applied to ray tracing performed, for example, in the production of film pictures. However, for ray tracing, since the calculation time of several minutes to several days is allowed and the real time response is not required, and a calculation by using all the owned calculation resources for oneself is allowed, a situation for which competition is required does not occur.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image processing system for generating an image of a three dimensional structure using a volume data, said image processing system having a plurality of nodes coupled via a network, each of which belonging to at least any one of a job requesting side and a job accepting side, where at least one of said plurality of nodes is on the job requesting side, said one of plurality of nodes on the job requesting side is constituted in combination with a control portion comprising at least a processor, a memory, and a communication control portion, said control portion being operative to:

segment at least one of a plurality of image processing requests into a plurality of jobs in an image processing operation that use the volume data;

monitor a calculation resource amount for each of said plurality of nodes on the job accepting side to obtain a calculation resource information, said calculation resource information being calculated from at least any one of a current load factor, a performance record in the past, a node status specification, and a distance to the node on the network;

select at least two nodes on the job accepting side based on said calculation resource information;

transmit an identical one of said segmented jobs to each of said at least two nodes, so that said identical one of said segmented jobs is a competitively parallel processed job that is simultaneously and competitively processed by each of said at least two nodes;

receive a processing result of said competitively parallel processed job; and select some but not all of said at least two nodes, wherein the selected some of said at least two nodes are still engaged in processing said competitively parallel processed job, and transmit a halt command to each of the selected some of said at least two nodes, based on a progress of or a completion of said competitively parallel processed job.

2. The image processing system using said volume data according to claim 1, wherein said control portion further is operative to prioritize each of said segmented jobs to obtain a job priority, and rank the current operation capabilities of said plurality of nodes on the job accepting side based on said calculation resource information individually obtained by monitoring said calculation resource amount so as to determine a current operation ranking, wherein said at least two nodes on the job accepting side are selected based on the current operation ranking, and each of said segmented jobs is transmitted to said at least two nodes according to said job priority.

3. The image processing system using said volume data according to claim 2, wherein each of said segmented jobs is transmitted when a client selects data and initiates processing.

4. The image processing system using said volume data according to claim 3, wherein said segmented jobs are queued in said at least two nodes.

5. The image processing system using said volume data according to claim 4, wherein at least one of said at least two nodes is capable of processing said transmitted segmented jobs automatically according to said job priority.

6. The image processing system using said volume data according to claim 4, wherein at least one of said at least two nodes is capable of changing the priority of said transmitted segmented jobs.

7. The image processing system using said volume data according to claim 4, wherein at least one of said at least two nodes is capable of processing said transmitted segmented jobs in parallel.

8. The image processing system using said volume data according to claim 2, wherein each of said segmented jobs is transmitted when a client commands.

9. The image processing system using said volume data according to claim 8, wherein said segmented jobs are queued in said at least two nodes.

10. The image processing system using said volume data according to claim 9, wherein at least one of said at least two nodes is capable of processing said transmitted segmented jobs automatically according to said job priority.

11. The image processing system using said volume data according to claim 9, wherein at least one of said at least two nodes is capable of changing the priority of said transmitted segmented jobs.

12. The image processing system using said volume data according to claim 9, wherein at least one of said at least two nodes is capable of processing said transmitted segmented jobs in parallel.

13. The image processing system using said volume data according to claim 2, wherein at least one of said at least two nodes is capable of transmitting segmented jobs to at least any other one of the plurality of nodes on the job accepting side.

14. The image processing system using said volume data according to claim 2, wherein said control portion further being operative to transmit a change command and a pause command of said competitively parallel processed job to said at least two nodes.

15. The image processing system using said volume data according to claim 2, wherein the image processing using said volume data includes at least any one of processing among a volume rendering processing, a region segmentation processing, a filtering processing, a noise removal processing, an image synthesis processing, a perfusion computation processing, a back projection processing, a projection processing and a geometry transformation processing.

16. The image processing system using said volume data according to claim 1, wherein at least one of said at least two nodes notifies said at least one of the plurality of nodes on the job requesting side of the progress and the completion of said competitively parallel processed job.

17. The image processing system using said volume data according to claim 1, wherein an operating state of said plurality of nodes on the job accepting side is displayed on a display screen of a client.

18. The image processing system using said volume data according to claim 1, wherein said at least two nodes are capable of transmitting a completion information of said competitively parallel processed job to notify the completion of said competitively parallel processed job, said control portion further being operative to receive said completion information, and transmit the halt command based on said completion information.

19. The image processing system using said volume data according to claim 1, wherein said at least two nodes are capable of transmitting a progress information of said competitively parallel processed job to notify the progress of said competitively parallel processed job, said control portion further being operative to receive said progress information, and transmit the halt command based on said progress information.

20. The image processing system using said volume data according to claim 1, wherein the image processing using said volume data includes at least any one of processing among a volume rendering processing, a region segmentation processing, a filtering processing, a noise removal processing, an image synthesis processing, a perfusion computation processing, a back projection processing, a projection processing and a geometry transformation processing.

21. The image processing system using said volume data according to claim 1, wherein said plurality of nodes includes at least any one of a computer, a supercomputer containing a plurality of CPUs, and a server.

22. A method of image processing for generating an image of a three dimensional structure using a volume data of an object, where a plurality of nodes are provided coupled via a network, said method comprising:

segmenting at least one of a plurality of image processing requests into a plurality of jobs in an image processing operation that use the volume data;

monitoring a calculation resource amount for each of said plurality of nodes to obtain a calculation resource information, said calculation resource information being calculated from at least any one of a current load factor, a performance record in the past, a node status specification, and a distance to the node on the network;

selecting at least two nodes based on said calculation resource information; and transmitting an identical one of said segmented jobs to each of said at least two nodes;

simultaneously and competitively processing said identical one of said segmented jobs by each of said at least two nodes, so that said identical one of said segmented jobs is a competitively parallel processed job;

receiving a processing result of said competitively parallel processed job; and selecting some but not all of said at least two nodes, wherein the selected some of said at least two nodes are still engaged in processing said competitively parallel processed job, and transmitting a halt command to each of the selected some of said at least two nodes, based on a progress of or a completion of said competitively parallel processed job, wherein said plurality of nodes includes at least any one of a computer, a supercomputer containing a plurality of CPUs, and a server.

* * * * *

UNITED STATES PATENT AND TRADEMARK OFFICE
CERTIFICATE OF CORRECTION

| | | |
|---|---|---|
| PATENT NO. | : 7,616,205 B2 | Page 1 of 1 |
| APPLICATION NO. | : 11/069718 | |
| DATED | : November 10, 2009 | |
| INVENTOR(S) | : Kazuhiko Matsumoto | |

It is certified that error appears in the above-identified patent and that said Letters Patent is hereby corrected as shown below:

On the Title Page, the following publication has not been included and was disclosed on March 1, 2005:

Lichtenbelt, B; Crane, R; Naqvi, S. "Introduction to Volume Rendering". IN: Hewlett-Packard Professional Books, Chapter 6, pgs. 121-138. Published 1998.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,616,205 B2  Page 1 of 1
APPLICATION NO. : 11/069718
DATED : November 10, 2009
INVENTOR(S) : Kazuhiko Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Nineteenth Day of October, 2010

David J. Kappos
*Director of the United States Patent and Trademark Office*